(12) United States Patent
Memon

(10) Patent No.: US 7,847,006 B2
(45) Date of Patent: *Dec. 7, 2010

(54) MODIFIED POLYMER WITH PARTITIONING AGENT

(76) Inventor: Mohammed Memon, 22756 Zulla Chase Pl., Ashburn, VA (US) 20148

(*) Notice: Subject to any disclaimer, the term of this patent is extended or adjusted under 35 U.S.C. 154(b) by 303 days.

This patent is subject to a terminal disclaimer.

(21) Appl. No.: 12/115,740

(22) Filed: May 6, 2008

(65) Prior Publication Data

US 2008/0269398 A1 Oct. 30, 2008

Related U.S. Application Data

(63) Continuation-in-part of application No. 11/092,962, filed on Mar. 29, 2005, now Pat. No. 7,371,794, which is a continuation-in-part of application No. 10/330,894, filed on Dec. 27, 2002, now Pat. No. 6,884,831.

(51) Int. Cl.
*C08K 5/01* (2006.01)
*C08L 91/06* (2006.01)

(52) U.S. Cl. ................... 524/487; 524/489

(58) Field of Classification Search ............ 524/487, 524/489, 492, 493
See application file for complete search history.

(56) References Cited

U.S. PATENT DOCUMENTS 4,242,246 A * 12/1980 Maldonado et al. ........... 524/71
7,371,794 B2 * 5/2008 Memon ...................... 524/487

FOREIGN PATENT DOCUMENTS

JP 06-221439 * 8/1994

* cited by examiner

*Primary Examiner*—Peter Szekely
(74) *Attorney, Agent, or Firm*—Laubscher & Laubscher, P.C.

(57) ABSTRACT

A modifier material and method for making the same is characterized by the addition of a partitioning agent to a polymer material such as synthetic rubber to prevent reagglomeration of the rubber. The partitioning agent reduces the time required to disperse the modifier material in a material to be modified and also reduces the viscosity of the modified material so that the modified material is easier to handle. The partitioning agent preferably includes a mixture of phenyl formaldehyde resin and precipitated silica gel.

16 Claims, 3 Drawing Sheets

MODIFIED POLYMER WITH PARTITIONING AGENT

This application is a continuation in part of application Ser. No. 11/092,962 filed Mar. 29, 2005, now U.S. Pat. No. 7,371,794, which was a continuation in part of application Ser. No. 10/330,894 filed Dec. 27, 2002, now U.S. Pat. No. 6,884,831.

BACKGROUND OF THE INVENTION

The use of polymers to make polymer modified asphalt (PMA) is growing nationally and internationally. The increased use of polymers to modify asphalt is because most base or virgin asphalts are not suitable for use in different environments owing to different geographical and temperature conditions around the country. In order to satisfy the demand for more polymers, manufacturers are seeking to increase production, especially of less expensive polymers which are suitable for asphalt modification. Polymers are also suitable for use in the adhesive and shoe industries and particularly for making shoe soles.

One type of economical polymer which is readily available at a reasonable price is synthetic rubber or butadiene back bone polymer because of its high volume of consumption. Block copolymers are also readily available. Most of these commodity type polymers reagglomerate after grinding into crumb rubber or into its crumb form, which is a major drawback to their acceptance by the asphalt modification, adhesive, and footwear industries. The present invention relates to a method for treating a polymer such as synthetic rubber which prevents reagglomeration of the synthetic rubber. This reduces the dispersion time of the polymer into the asphalt or other material with which it is mixed and also decreases the viscosity of the resulting product.

BRIEF DESCRIPTION OF THE PRIOR ART

Modified asphalts including polymer and crumb rubber are well-known in the patented prior art, as evidenced by the Memon U.S. Pat. No. 6,444,731. This patent discloses the use of furfural or vegetable oil as a dispersion agent for the modifier material which comprises butadiene back bone polymers or crumb rubber to form a treated modifier material which disperses quickly into asphalt. The rapid dispersal of the modifier material reduces the production time of the modified asphalt, thereby reducing its cost. In addition, the modified asphalt has improved low and high temperature rheological properties.

While the prior polymer modified products operate satisfactorily, there is one drawback to the efficient production thereof. This is the tendency of the polymer and crumb rubber to reagglomerate which reduces the homogeneity of the resulting product. This in turn increases the cost of manufacturing and handling the product.

SUMMARY OF THE INVENTION

The present invention was developed in order to overcome these and other drawbacks of prior polymer modified products by providing improved treatments of the modifier material before it is mixed with another product such as asphalt or fillers used for manufacturing adhesive and shoe soles. Specifically, the modifier is treated with a partitioning agent such as a polyethylene or polymethylene wax and phenyl formaldehyde resin so that the modified product resists reagglomeration. Another type of partitioning agent includes a wax and a mixture of phenyl formaldehyde resin and precipitated silica gel. The resulting product has reduced viscosity and improved distribution of the modified polymer therein.

The invention further utilizes a butadiene back boned polymer as the modifier for the asphalt and block copolymers for adhesives and shoe soles. These polymers include Soloprene 1205 and 1502 elastomer which are found in pulverized or crumb rubber. The most popular block copolymers are styrene butadiene styrene (SBS), styrene butadiene rubber (SBR), and styrene butadiene (SB). The major difference in SBS, SBR, and SB for the asphalt, adhesive, and footwear industries is the amount of styrene in the polymer.

BRIEF DESCRIPTION OF THE FIGURE

Other objects and advantages of the invention will become apparent from a study of the following specification when viewed in the light of the accompanying drawing, in which.

DETAILED DESCRIPTION

The preferred polymers which are modified according to the invention are synthetic rubbers such as butadiene back boned polymers. Specific examples of such rubbers are Soloprene 1205, from Dynasol, which is a butadiene back boned styrene butadiene (SB) block copolymer and 1502 elastomer, also from Dynasol, which is a butadiene back boned styrene butadiene rubber (SBR). Both of these synthetic rubbers are commodity polymers which are readily available and inexpensive. A further rubber which is suitable for use according to the invention is a styrene butadiene styrene (SBS) polymer.

Figure 1:
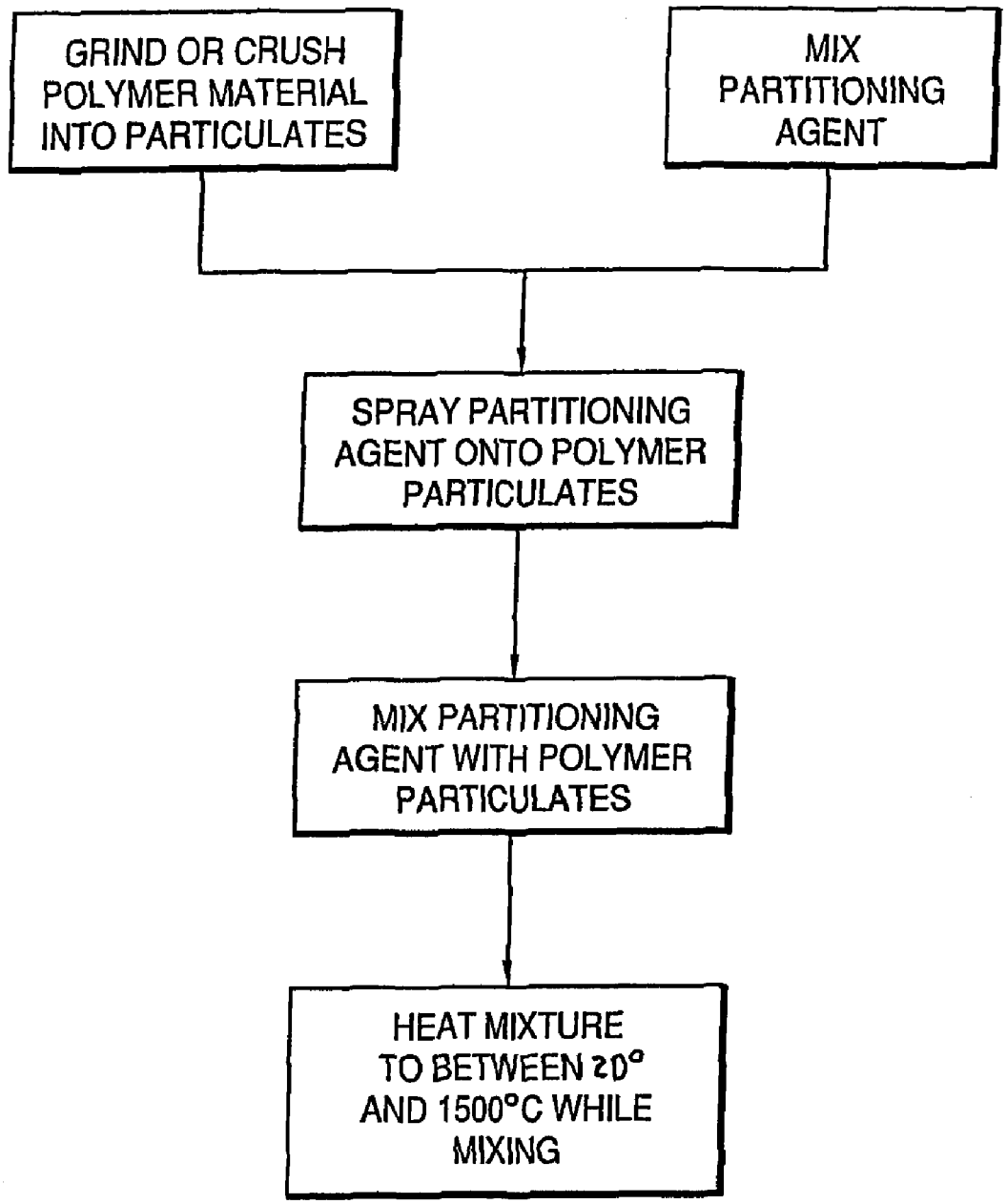
FIG. 1 is a flow diagram showing the method steps for treating polymer with a partitioning agent according to the invention.

Referring to FIG. 1, the polymers are preferably ground or crushed into smaller particulates. The particulates are treated with a partitioning agent, preferably by spraying the agent onto the polymer particles and then mixing the same to form a treated modifier material. A preferred partitioning agent is a polyethylene wax, a polymethylene wax (i.e. a Fischer-Tropsch wax such as EnHance™ polymethylene hydrocarbon manufactured by Plastic Technology Service Ltd.) or a linear aliphatic hydrocarbon polymer. In addition, a phenyl formaldehyde resin with precipitated silica is mixed with the wax or polymer prior to mixing with the synthetic rubbers. Synthetic polymer is preferred over natural polymer because it has different properties which assist with the manufacturing process. Specifically, the combination of synthetic linear aliphatic hydrocarbon polymer and phenyl formaldehyde resin acts as a good partitioning agent for synthetic rubbers in that they prevent reagglomeration of the synthetic rubber modifier. In a preferred embodiment, the phenyl formaldehyde resin includes precipitated silica gel which further prevents reagglomeration of the synthetic rubber modifier.

The treated polymer modifier material is mixed so that the partitioning agent is thoroughly distributed throughout the synthetic rubber. If desired, the mixture is also heated while mixing. Heating is conducted in the range of between 20° C. and 1500° C., but preferably in the range of 160° C. and 210°

C. Mixing occurs for up to 10 minutes, but less time is normally required because of the properties of the partitioning agent.

Figure 2:
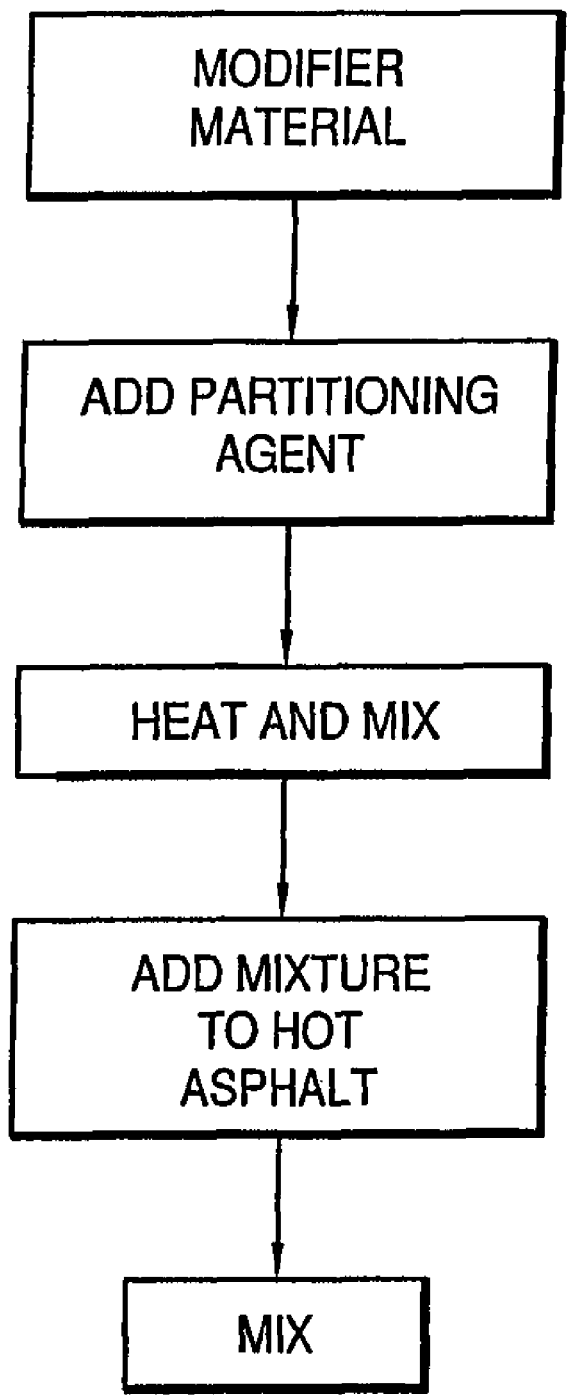
FIG. 2 is a flow diagram showing the method steps for making modified asphalt according to a preferred embodiment of the invention.

Referring to FIG. 2, the treated polymer material according to the invention is added to hot asphalt, preferably having a temperature of 160° C.-210° C., and mixed, preferably by stirring. The resulting modified asphalt resists reagglomeration of the synthetic rubber and is characterized by reduced viscosity and improved rheological properties of both high and low temperatures.

Two versions of modified polymers according to the invention and the corresponding unmodified polymer were tested for reagglomeration by a conventional industrial protocol using Instron's Tensile Instrument. The first modified polymer was treated with a partitioning agent including polyethylene wax and phenyl formaldehyde resin and the second modified polymer was treated with a partitioning agent including a mixture of polymethylene, phenyl formaldehyde resin and precipitated silica gel. The test results are shown in Table I.

asphalt modification techniques can be achieved. This is because once the partitioning agent enters the polymer modifier material, the partitioning agent melts when added to hot asphalt due to its low melting point. The change in state creates a new hydraulic pressure which breaks the particles of polymer in the modifier.

A further benefit of polymer modified asphalt including a partitioning agent is the reduced viscosity of the asphalt. Such an asphalt may be highly concentrated and transported via a pump which facilitates the construction of roadways, parking lots and the like from the modified asphalt.

Table II shows the continuous performance grade (PG) of neat, untreated polymer modified asphalt (PMA) and treated polymer modified asphalt.

TABLE I

|  | Electro-mechanical Force for Untreated Polymer | Electro-mechanical Force for First Treated Polymer | Electro-mechanical Force for Second Treated Polymer | Dispersion Time | Viscosity @ 135° C. cP Using 10% of Polymer |
|---|---|---|---|---|---|
| Soloprene 1205 (SB0 Un-Treated | 30 Kilo Force |  |  | 40 minutes | 4700 |
| Soloprene 1205 (SB) Treated |  | 8 Kilo Force | 1 Kilo Force | 5 minutes | 2730 |
| 1502 (SB) Elastomer Un-Treated | 150 Kilo Force |  |  | 45 minutes | 6100 |
| 1502 (SB) Elastomer Treated |  | 19 Kilo Force | 3 Kilo Force | 7 minutes | 3310 |
| SBS 411 Un-Treated | 20 Kilo Force |  |  | 35 minutes | 5710 |
| SBS 411 Treated |  | 4 Kilo Force | 1 Kilo Force | 5 minutes | 3140 |

An acceptable number for reagglomeration is 20 Kilo force or lower. Table I establishes that the partitioning agent including phenyl formaldehyde resin and wax or polymer according to the invention is extremely beneficial to prevent reagglomeration of the synthetic rubber modifier. Even better results were obtained with the second treated polymer including polymethylene wax, phenyl formaldehyde resin and precipitated silica gel. After use of the partitioning agent, styrene butadiene (SB) type polymer acts just like a styrene butadiene styrene (SBS) type polymer.

Figure 3:
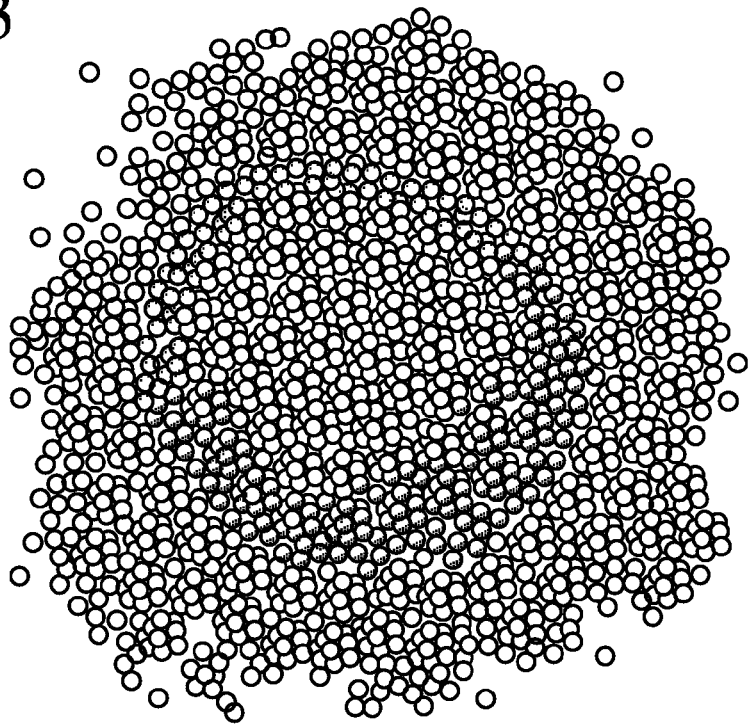
FIG. 3 is a photograph of a polymer treated with a partitioning agent of wax, phenyl formaldehyde resin and precipitated silica gel.

In FIG. 3 is shown Soloprene 1205 (SB) polymer which has been formed by extrusion and treated with a partitioning agent comprising a wax and a mixture of phenyl formaldehyde and precipitated silica gel. The partitioning agent is 5% by weight of polymer and the treated polymer demonstrated a 0 Kilo force. Thus it was not possible to re-agglomerate the polymer to form a block of material.

Another benefit attendant with the invention is the reduction in dispersion time of polymer in asphalt. Dispersion times which are three to four times faster than those of prior

TABLE II

| Asphalt | Polymer | Neat PG | Untreated PMA PG | Treated PMA PG |
|---|---|---|---|---|
|  | Dynasol Soloprene 1205 |  |  |  |
| BP Asphalt | 4% Polymer Treated or Untreated | 65-23 | 80-20 | 82-23 |
| Irving Asphalt | 4% Polymer Treated or Untreated | 53-35 | 69-33 | 70-34 |
|  | Dynasol 1502 Elastomer |  |  |  |
| BP Asphalt | 4% Polymer Treated or Untreated | 65-23 | 81-21 | 83-23 |

TABLE II-continued

| Asphalt | Polymer | Neat PG | Untreated PMA PG | Treated PMA PG |
|---|---|---|---|---|
| Irving Asphalt | 4% Polymer Treated or Untreated | 53-34 | 70-33 | 71-35 |

As shown in Table II, the partitioning agent impacts the polymer and shows slight improvement for both high and low temperature rheological properties over untreated polymer. The performance grades for the treated polymer are higher than those for untreated polymer.

Figure 4:
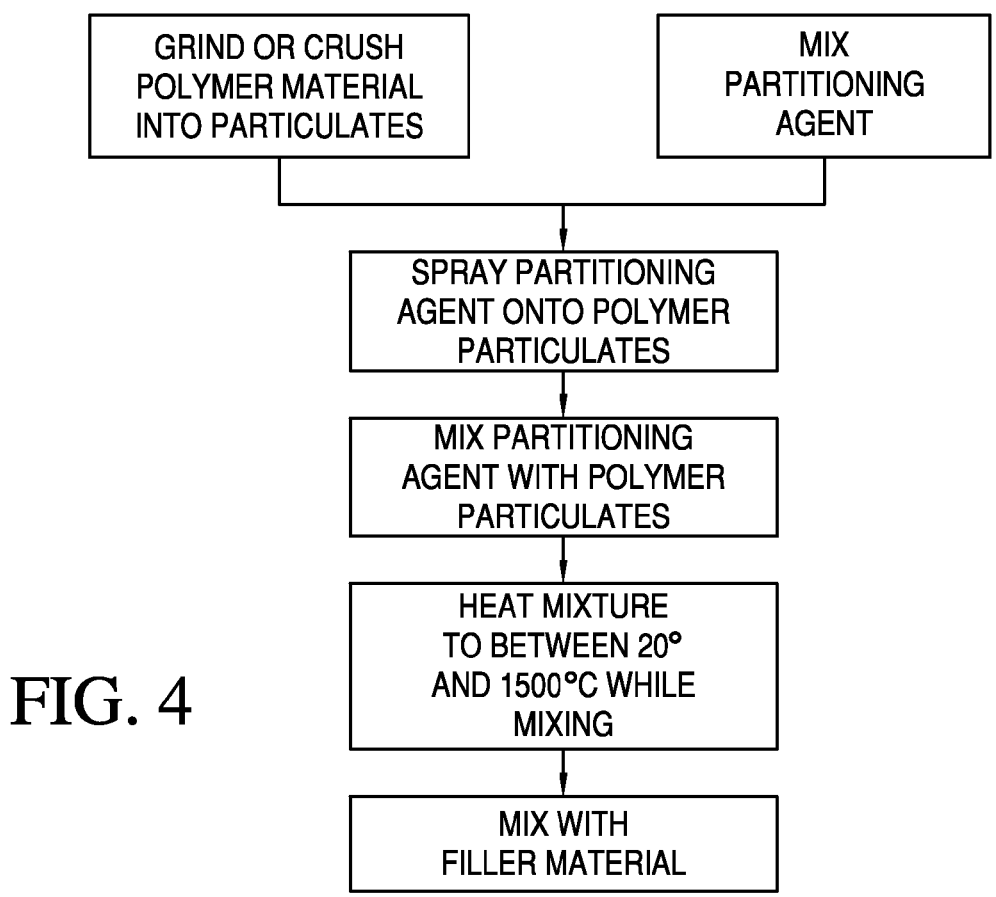
FIG. 4 is a flow diagram showing the method steps for making modified polymer according to the invention.

Referring now to FIG. 4, a method for using the modified polymer material in the manufacture of soles for footwear will be described. The polymers used in this embodiment of the invention are preferably block copolymers having a higher amount of styrene in the polymer. The polymer is formed into particulates and the partitioning agent is formed from a mixture of wax or polymer and resin or a mixture of wax or polymer and resin and silica gel as in the embodiment of FIG. 1. The partitioning agent is sprayed onto the particulates which are then mixed and, if desired, heated to between 20° C. and 1500° C., but preferably between 160° C. and 210° C. so that the polymer is modified to incorporate the partitioning agent. The resulting modified polymer prevents reagglomeration of the polymer. The modified polymer is mixed with fillers known to people in the footwear art to form a composite material suitable for use in forming the soles for shoes.

The addition of precipitated silica to a Fischer-Tropsch wax and phenolic resin (i.e. the second partitioning agent described above with reference to Table I) enhances the anti-blocking characteristic significantly as shown in FIG. 3 in comparison to a polymer treated with a partitioning agent without precipitated silica (i.e. the first partitioning agent described above with reference to Table I). The partitioning agent without precipitated silica demonstrates rheological properties that are the same using two different formulations: 4% polymer and 4% polymer with 0.2% partitioning agent. The partitioning agent with the precipitated silica shows rheological properties that are the same using two different formulations: 4% polymer and 3.8% polymer with 0.2% partitioning agent. Thus the partitioning agent including the precipitated silica is more economical. The second partitioning agent with precipitated silica allows a polymer manufacturer to use the crumb form of Soloprene 1205 not only in the manufacture of asphalt and shoes but also in adhesives.

The second partitioning agent also works with butadiene backbone polymers such as block copolymers used in the adhesive and shoe sole industries. The most popular polymers are styrene butadiene styrene (SBS), styrene butadiene rubber (SBR) and styrene butadiene (SB) block copolymers to keep them in a free floating condition as well as acting as a reagglomerating agent. The major difference in SBS, SBR and SB polymers for the asphalt, adhesive, and shoe sole industries is the amount of styrene in the polymer. The function of the second partitioning agent with silica it to keep the polymer in free floating position to stop reagglomeration. This will allow the adhesive and shoe sole industries to use these commodity type polymers, which under normal conditions are not suitable ingredients and are in blocks weighing 50-80 pounds.

While the preferred forms and embodiments of the invention have been illustrated and described, it will be apparent to those of ordinary skill in the art that various changes and modifications may be made without deviating from the inventive concepts set forth above.

What is claimed is:

1. A method for making a modified polymer, comprising the steps of:
   (a) mixing a phenyl formaldehyde resin with a polyethylene wax, a polymethylene wax (Fischer-Tropsch wax) or a linear aliphatic hydrocarbon polymer and precipitated silica to form a partitioning agent; and
   (b) mixing the partitioning agent with particles of synthetic rubber material to produce a modified polymer which resists reagglomeration.

2. A method as defined in claim 1, wherein said synthetic rubber comprises a butadiene back bone polymer or a block co-polymer.

3. A method as defined in claim 2, wherein said synthetic rubber comprises styrene butadiene styrene, styrene butadiene, or styrene butadiene rubber.

4. A method as defined in claim 1, wherein said mixing step is performed at a temperature of between 20° C. and 1500° C.

5. A method as defined in claim 4, wherein said mixing step is performed at a temperature of between 160° C. and 210° C.

6. A method for making an adhesive and footwear sole material, comprising the steps of:
   (a) mixing a phenyl formaldehyde resin with a polyethylene wax, a polymethylene wax (Fischer-Tropsch wax) or a linear aliphatic hydrocarbon polymer and precipitated silica to form a partitioning agent;
   (b) mixing the partitioning agent with particles of synthetic rubber material to produce a modified polymer which resists reagglomeration;
   (c) adding the modified polymer to a filler material; and
   (d) mixing the combination of modified polymer and filler material to produce a composite material which resists reagglomeration of the synthetic rubber and which has reduced viscosity.

7. A method as defined in claim 6, wherein said synthetic rubber comprises a butadiene back bone polymer or a block co-polymer.

8. A method as defined in claim 7, wherein said synthetic rubber comprises styrene butadiene styrene, styrene butadiene, or styrene butadiene rubber.

9. A method as defined in claim 6, wherein said mixing step is performed at a temperature of between 20° C. and 1500° C.

10. A method as defined in claim 9, wherein said mixing step is performed at a temperature of between 160° C. and 210° C.

11. A modifier material, comprising consisting essentially of
   (a) a synthetic rubber material; and
   (b) a partitioning agent mixed with said rubber material to resist reagglomeration of the synthetic rubber material, said partitioning agent including a phenyl formaldehyde resin mixed with a precipitated silica, a polyethylene wax, a polymethylene wax (Fischer-Tropsch wax) or a linear aliphatic hydrocarbon polymer.

12. A modifier material as defined in claim 11, wherein said synthetic rubber comprises a butadiene back bone polymer or a block co-polymer.

13. A modifier material as defined in claim 12, wherein said synthetic rubber comprises styrene butadiene styrene, styrene butadiene, or styrene butadiene rubber.

14. An adhesive and footwear sole material, consisting essentially of
 (a) a modifier material, including
  (1) a synthetic rubber material; and
  (2) a partitioning agent mixed with said rubber material, said partitioning agent including a phenyl formaldehyde resin mixed with precipitated silica, a polyethylene wax, a polymethylene wax (Fischer-Tropsch wax) or a linear aliphatic hydrocarbon polymer;
 and (b) a filler material mixed with said modifier material to produce a composite material which resists reagglomeration of the synthetic rubber and which has reduced viscosity.

15. An adhesive and footwear sole material as defined in claim 14, wherein said synthetic rubber comprises a butadiene back bone polymer or a block co-polymer.

16. An adhesive and footwear sole material as defined in claim 15, wherein said synthetic rubber comprises styrene butadiene styrene, styrene butadiene, or styrene butadiene rubber.

* * * * *